1,748,015

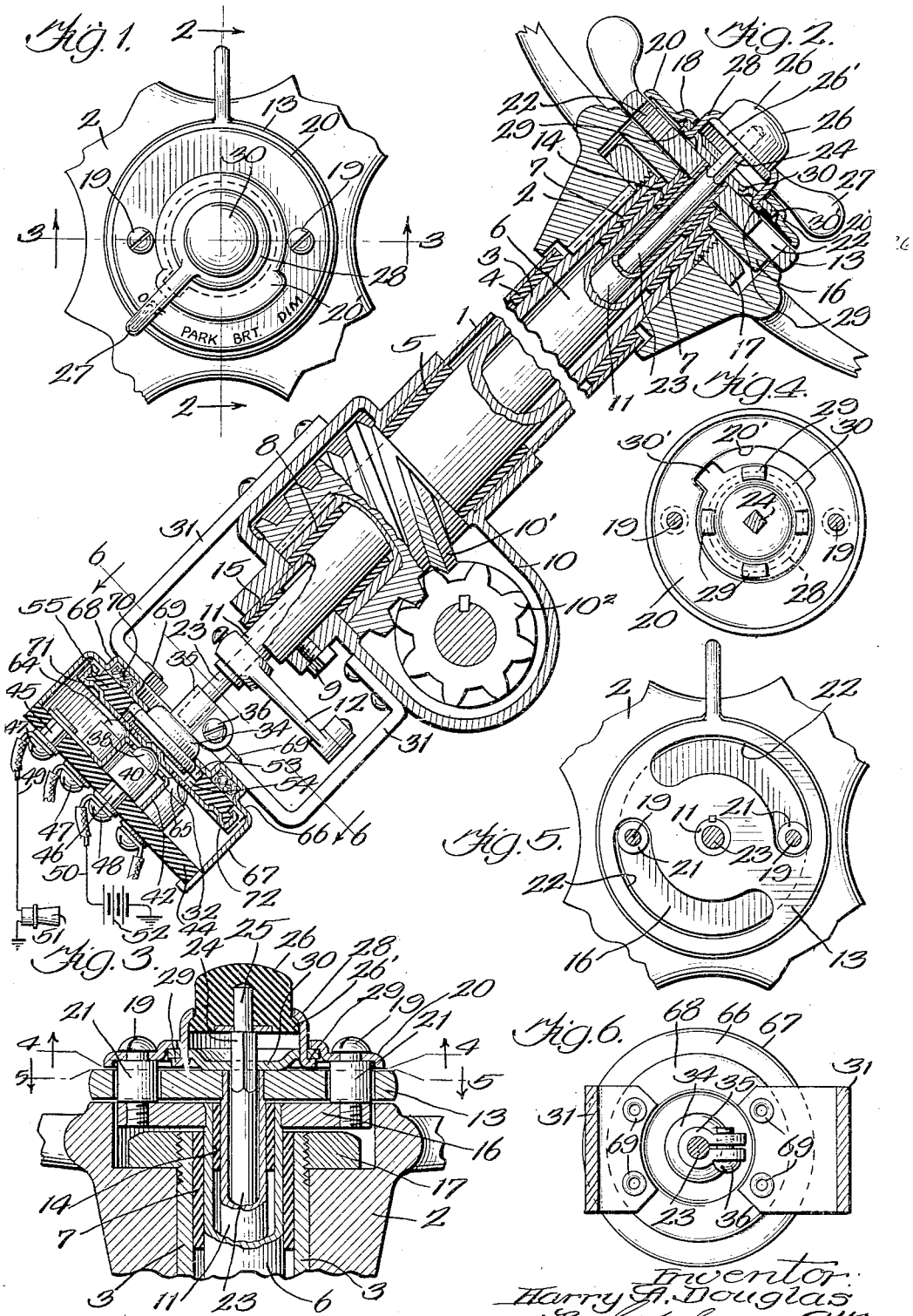

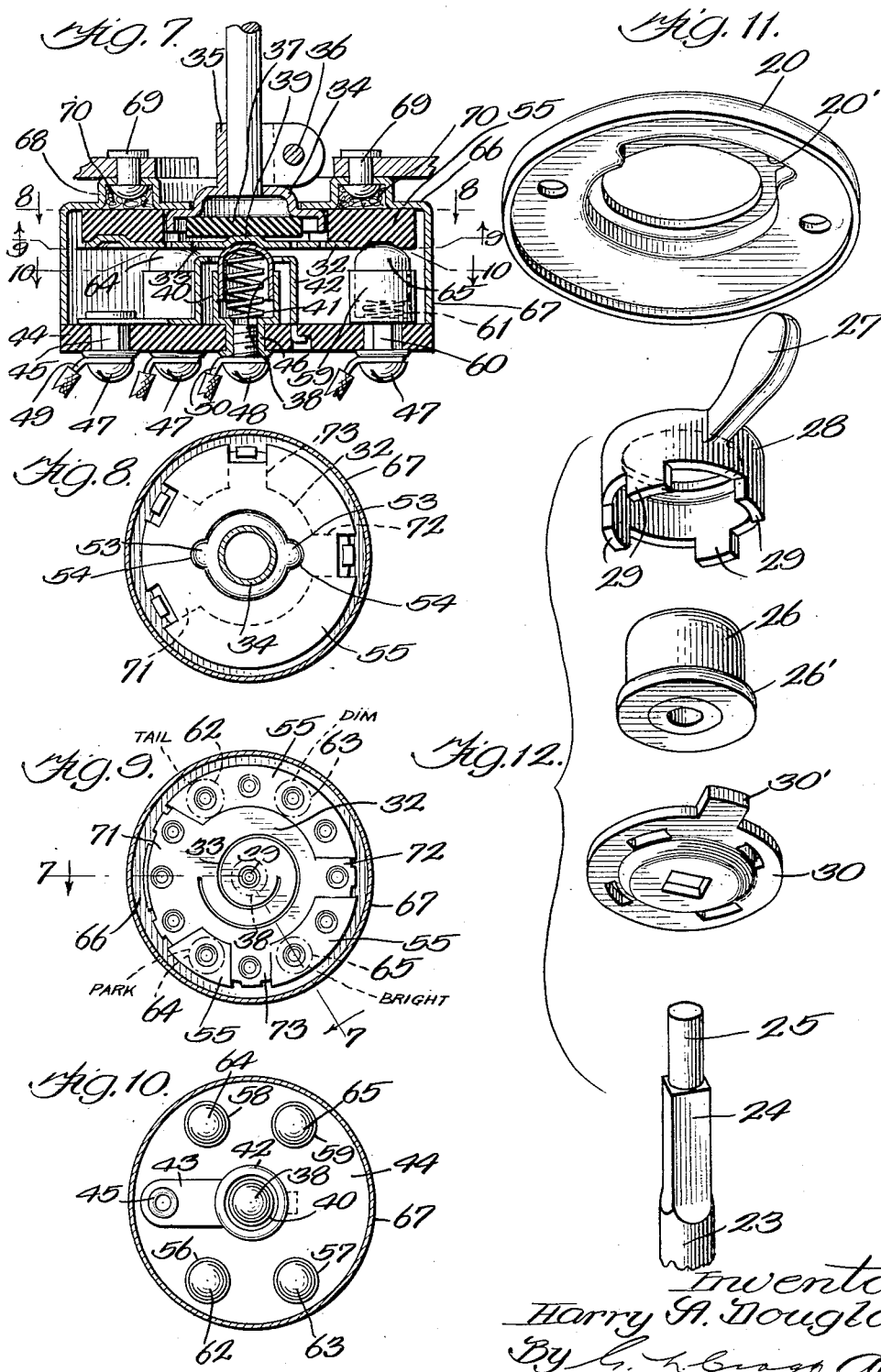
Feb. 18, 1930.  H. A. DOUGLAS  1,748,015
COMBINED LIGHTING AND SIGNALING SWITCH
MECHANISM FOR AUTOMOTIVE VEHICLES
Filed Feb. 6, 1928   2 Sheets-Sheet 2
Inventor.
Harry A. Douglas Patented Feb. 18, 1930

UNITED STATES PATENT OFFICE

HARRY A. DOUGLAS, OF BRONSON, MICHIGAN

COMBINED LIGHTING AND SIGNALING SWITCH MECHANISM FOR AUTOMOTIVE VEHICLES

Application filed February 6, 1928. Serial No. 252,280.

My invention relates to automotive vehicles and has for its object the provision of an improved unitary mechanism for controlling the switching mechanism that pertains to the lighting and the horn or signaling circuits.

The structure of my invention is inclusive of the manually operable steering shaft of the vehicle, this shaft being mounted to turn and carrying a steering wheel upon one end, a rotatable and reciprocable rod extending along said shaft and having one end in the region of the other end of said shaft, a lever coupled with the rod to turn it and with respect to which the rod is movable along the rod axis, a push button positioned to depress the rod, switching mechanism at the latter end of said rod, a lighting circuit having complemental contacts which are disposed to be engaged and separated by and upon suitable rotation of the rod, and a signaling circuit having complemental contacts which are disposed to be engaged by and upon depression of said rod. The hub of the lever that controls the lighting circuit or circuits is preferably hollow, the push button being assembled with and within this hub and projecting upwardly therefrom. The horn or signaling circuit is controllable independently of the lighting circuits and the lighting circuits are controllable independently of the horn or signaling circuit although the switch actuating rod is common to the switching mechanisms that pertain to both circuits.

I will explain my invention more fully by reference to the accompanying drawings in which Fig. 1 is a view looking toward the upper side of the steering wheel and illustrating a portion thereof and parts of the mechanism that are located above the wheel; Fig. 2 is a sectional view on line 2—2 of Fig. 1; Fig. 3 is a sectional view on line 3—3 of Fig. 1; Fig. 4 is a sectional view on line 4—4 of Fig. 3; Fig. 5 is a sectional view on line 5—5 of Fig. 3; Fig. 6 is a sectional view on line 6—6 of Fig. 2; Fig. 7 is a sectional view, on a larger scale, of the lower portion of the structure illustrated in Fig. 2; Fig. 8 is a sectional view on line 8—8 of Fig. 7, on a smaller scale; Fig. 9 is a sectional view on line 9—9 of Fig. 7, also on a smaller scale; Fig. 10 is a sectional view on line 10—10 of Fig. 7, also on a smaller scale; Fig. 11 is a perspective view of a stationary cup shaped member above the wheel through which the lighting lever passes and which serves to limit the extent of turning movement of this lever; and Fig. 12 shows in perspective and in separated relation the lighting lever, the horn button, the upper portion of the switch operating rod and a disc member coupling the lever with the rod.

The structure illustrated is inclusive of a stationary tubular steering column 1 which is suitably anchored upon the vehicle and above the upper end of which the steering vehicle wheel 2 is mounted and keyed to the hollow vehicle steering shaft 3. This steering shaft is adapted to turn within bearings 4 and 5 that surround it and are surrounded by the column which carries these bearings. Said steering shaft 3 encloses a hollow rod 6 which is coaxial with the shaft and column, this hollow rod being spaced apart from the shaft 3 by bearing sleeves 7 and 8 and being held stationary by a set bolt 9 which passes through the lower end of the gear casing 10 which is in fixed relation to the steering column. This gear casing encloses the worm 10' that is fixed upon the steering shaft 3 and the worm wheel $10^2$ through which the shaft 3 and the worm 10' operate the steering ground wheels. Another hollow shaft 11 is surrounded by the aforesaid column, shaft and hollow rod and is coaxial therewith, this shaft 11 being coupled with gas controlling lever mechanism of which a part 12 is illustrated and having a control lever 13 upon its upper end and above the wheel whereby it may be turned. The parts 6 and 11 are spaced by bearing sleeves 14 and 15. A flange 16 is fixed upon the upper end of the stationary rod 6 and overlies the bearing sleeve 7, the upper end of the steering shaft 3 and the nut 17 which is screwed upon the upper end of the steering shaft to maintain the steering wheel 2 in assembly with this shaft.

The inverted cup 18 is held in a stationary position by means of screws 19 which pass through the flange 20 of the cup and into the stationary flange 16 upon the stationary rod 6. The portion 20 may also serve, if desired, as an escutcheon plate, Fig. 1, having thereon designations of the different circuit adjustments that correspond to the different adjustments of the lighting circuits. Spacing sleeves 21 hold the cup in spaced apart relation to the flange 16 to accommodate the lever 13 which has arcuate slots 22 through which the screws 19 and spacing sleeves 21 are passed, these slots being of sufficient length to permit the lever 13 to turn throughout the desired range.

The rod 23 is rotatable and slidable within the hollow shaft 11. The lower end of this rod extends below the steering column and its upper end passes through and terminates above the steering wheel 2. The upper end portion of the rod 23 is square in part, as indicated at 24 and is round at the extreme end as indicated at 25, a shoulder being at the upper end of the square portion which may be pushed upon by the insulating horn or signal button 26 to depress said rod whose lower end pushes upon a horn or signal switch to close it. A lighting switch lever 27 has a hollow hub portion 28 that has tongues 29 which pass through a disc 30. This disc has a square hole at its center that affords a sliding fit between the disc and the rod portion 24, the rod 23 and the lever 27 being thus in sliding splined connection permitting this rod to be reciprocably moved while the turning engagement of the lever 27 therewith is maintained. The button 26 is journaled upon the rod portion 25. It is thus not forced to turn with lever 27. The hub 28 has a circular hole through its upper portion through which the push button 26 projects. By means which will be hereinafter set forth, the rod 23 is normally pressed upwardly to place the push button in its normally uppermost position. Said button is retained in assembly with lever hub 28 by the button flange 26' and the overlying position of said hub. The extent to which the lever may be turned is defined by the tongue 30' on disc 30 and the end walls of the arcuate slot 20' that receives said tongue and is provided in the stationary cup flange 20.

The switching mechanism which is controlled by the rod 23 is carried at the lower end of a bracket structure 31 which is carried upon the lower end of the stationary steering column 1 by being screwed to the gear casing 10. A spring 32 presses upon the rod 23 longitudinally of its axis to normally maintain this rod together with the handle thereon in the uppermost position along the axis of this rod. This spring is also a contact actuator, this actuator being also preferably a contact carrier to which end this spring is in the form of a resilient metallic plate through which a spiral slot 33 is cut around the axis of the rod 23 whereby the central portion of the plate constitutes a flat spring tongue which, by virtue of its resiliency, is normally constrained to remain within the general plane of the plate. A socket 34 is provided upon the lower end of the rod 23, this socket having a split stem 35 which is clamped upon the rod by the screw 36. A disc 37 of insulation is received in said socket and pressed upon by the top side of the central spring tongue portion of the plate 32. The upper end of a metallic plunger contact 38 is received in the inverted cup shaped recess 39 that is centrally formed in the plate 32. The contact 38 is received within a metallic spring barrel 40 which also receives a coiled spring 41 which presses upwardly upon the contact 38, the spring 41 cooperating with the spring tongue portion of the plate 32 in maintaining the rod 23 in its uppermost position. The plunger contact 38 and the metallic spring barrel 40 are surrounded by a metallic housing 42 which has a lateral extension 43 that is clamped against a contact carrying insulating disc 44 by means of a sleeve rivet 45. The spring barrel 40, itself, has a hollow sleeve continuation 46 which is also riveted to the disc 44. Binding screws 47 and 48 are screwed into said sleeves 45 and 46 to clamp circuit wires 49 and 50 in mechanical and electrical connection with said sleeves. The wire 49 is grounded through the horn or other signaling device 51. The wire 50 is grounded through the battery 52. When the rod 23 is depressed, the spiral spring tongue at the central portion of the plate 32 is depressed into engagement with the metallic housing 42 whereupon the signaling device 51 operates. When the pressure upon the rod is relieved, the plate 32 and the coiled spring 31 restore the rod to its uppermost position.

The socket 34 is formed with laterally projecting ears 53 which are received within diametrically opposite recesses 54 that are provided within the insulating ring 55 upon which the plate 32 is secured, this plate and ring together constituting a contact actuator and carrier. Other metallic spring barrels 56, 57, 58 and 59 are provided with sleeve extensions 60 which are also secured to the disc 44. These spring barrels contain springs 61 which press upwardly upon the plunger contacts 62, 63, 64 and 65 which, in turn, press upwardly against the insulating ring 55 or against the plate 32, according to the position to which this ring is turned consequent upon turning the rod 23. Said spring pressed contacts 62, 63, 64 and 65 press the ring 55 against the uppermost or end wall 66 of an inverted cup whose cylindrical wall 67 surrounds the ring 55 and the disc 44, this disc constituting a closure that is clinched upon the rim of the cup. The cup wall 66 has an annular extension 68 which is secured to the bracket structure 31 by the rivets 69. Waterproof packing 70 is contained in the annular channel that is defined within said annular extension 68.

Changes may be made without departing from the invention.

Having thus described my invention, I claim:

1. The combination with a rotatable and reciprocable rod; a lever coupled with the rod to turn it and with respect to which the rod is movable along the rod axis; a push button positioned to depress the rod; and switching mechanism including complemental contacts that are engageable upon rotation of the rod and complemental contacts that are engageable upon depression of the rod, the lever having a hollow hub surrounding the push button and having an opening exposing the button for operative engagement.

2. The structure of claim 1 wherein the button projects through the opening in the lever hub.

In witness whereof, I hereunto subscribe my name.

HARRY A. DOUGLAS.